United States Patent [19]
Portalis

[11] 3,949,705
[45] Apr. 13, 1976

[54] MANUALLY OPERABLE VACUUM MILKING SYSTEM

[76] Inventor: Mariano Gaston Rousseau Portalis, Mariano Moreno 457, La Lucila - Pcia. Buenos Aires, Argentina

[22] Filed: Dec. 11, 1974

[21] Appl. No.: 531,763

[30] Foreign Application Priority Data
Mar. 29, 1974  France .............................. 74.11405

[52] U.S. Cl. ............................. 119/14.43; 417/328
[51] Int. Cl.² ............................................... A01J 5/04
[58] Field of Search .......... 119/14.43, 14.39, 14.01; 417/328

[56] References Cited
UNITED STATES PATENTS
967,513   8/1910   Groff ................................ 119/14.39

1,197,717   9/1916   Disbrow ........................... 119/14.43

FOREIGN PATENTS OR APPLICATIONS
751,921   9/1933   France

*Primary Examiner*—Hugh R. Chamblee

[57] ABSTRACT

A vacuum milking machine system is supplied with a constant source of vacuum by a pump consisting of a free piston contained in a cylinder which can be manually rotated about a transverse axis, causing the free piston to fall under the influence of gravity as each end of the cylinder reaches the upper position. The system also includes a vacuum reserve tank and teat cups provided with automatic valves to prevent loss of vacuum when not in use.

10 Claims, 3 Drawing Figures

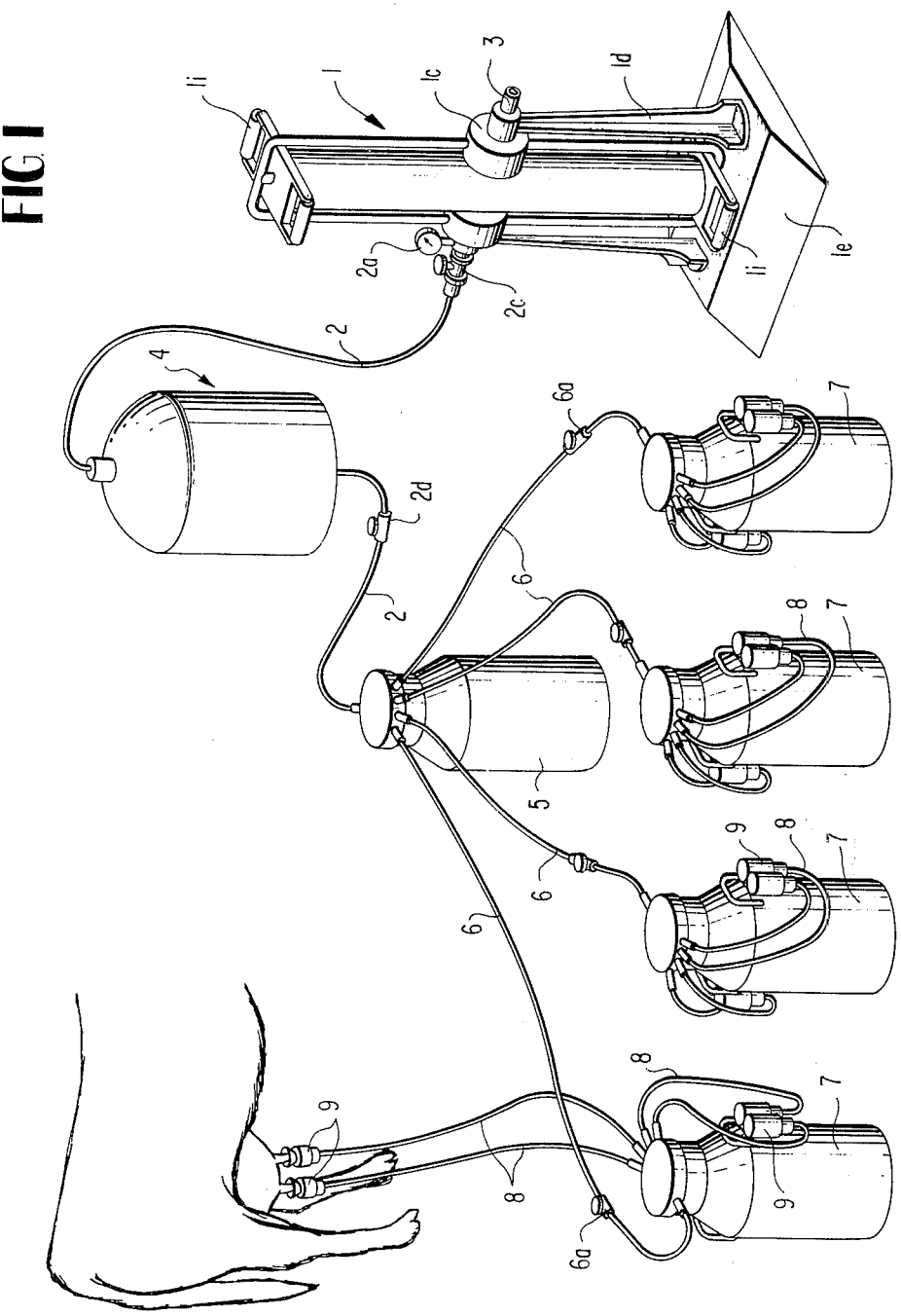

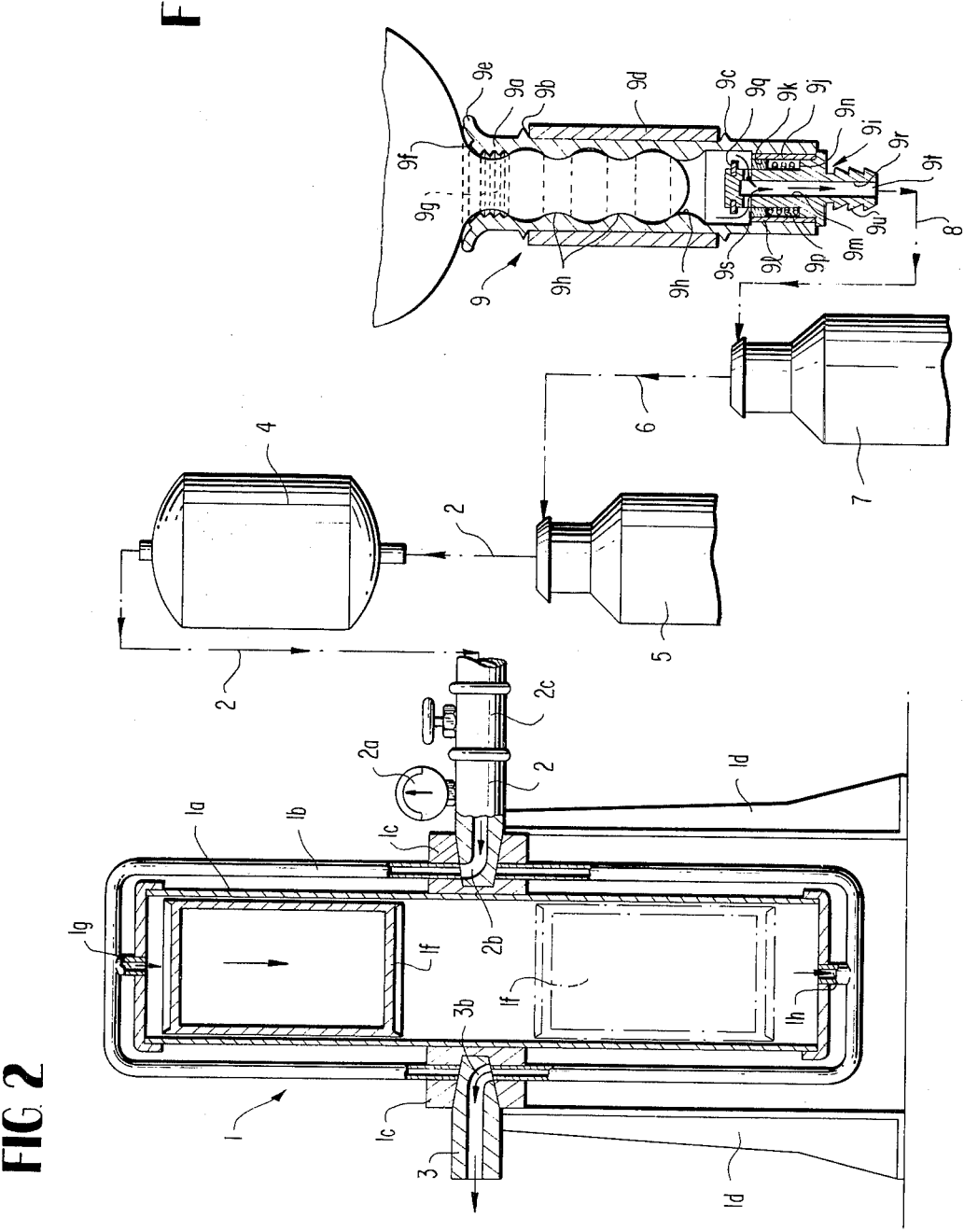

MANUALLY OPERABLE VACUUM MILKING SYSTEM

The present invention is related to a continuous milking machine, manually operated, which functions without any type of power unit and which is actuated only by a rotatably mounted cylinder which causes a depression or negative pressure in a reserve tank. Said cylinder and reserve tank are serially connected and the latter is in turn connected to a trap tank to which there is connected a plurality of tubings from respective collectors furnished with hoses which in their free ends have teat cups with automatic valves for blocking said hoses in their inoperative positions.

The cylinder which is part of the milking machine defines a chamber where there is a piston freely displaceable through its entire length by manually actuating the cylinder, mounted in a freely rotatable way on an axle, each of the ends of said chamber being interconnected to respective tubings which are associated each with a shut-off valve, one of which is connected to an exhaust tubing and the other to a suction tubing connected succesively to a vacuum reserve tank, a trap tank, from which a plurality of tubings branch out, the latter concurring to respective collector containers from which a series of flexible conduits are again branch out, each one provided at its end of a teat cup, being the teat cups comprised of hollow cylindrical bodies, furnished with antisliding members and sealings and automatic valve elements.

The present invention is related to a continuous milking machine, manually operated, which presents a series of novel devices which give it important constructive and functional characteristics that obtain evident practical advantages in their application and use for the specified purpose.

There are known motor driven milking machines which satisfactorily make their specific work, but due to their high price are practically out of reach of the economic means of small and medium milking operations, with the further inconvenience of these machines requiring in the operator certain degree of training that not all milking establishments are in conditions to provide, as well as the maintenance and repair service, which are frequently difficult to obtain in view of the distances from milking operations to populated centers. On the other hand, a further disadvantage that the motor driven equipments for milking have resided in the fact their noise upsets the animals in the time of milking, which causes a decrease in milk yield.

All these inconveniences are solved by the present manual milking machine of continuous flow, which works without any type of power unit, only through the actuation of a rotary cylinder, wherein is placed in free form, a sliding piston which when falls from the upper extreme of the rotary cylinder, produces in the upper part of the latter, a depression or negative pressure which originates a vacuum in a reserve tank connected to it, this tank being connected in turn to a trap pail from which a plurality of tubings extend, which are connected to respective collector containers, which in turn are provided of a plurality of hoses including at the extremes of each one teat cups which have respective automatic valves for blocking said hoses in their non operative position.

The constructive economy and simplicity of handling of this machine cause that for its operation and attention no skilled labor is required, being sufficient for actuating it only to rotate a few turns the cylinder, to obtain the reserve vacuum sufficient for milking four cows simultaneously, in a short time, continuously and silently.

This invention likewise has other additional objects in view, which will be understood in the course of the present specification.

In order that the present invention is clearly understood and put into practice with entire ease, it has been represented in way of example and in one preferred embodiment, in the accompanying drawings wherein:

FIG. 1 is a view of the present machine as a whole.

FIG. 2 is a diagram of the machine components and circuits, in which the vacuum pump and one of the teat cups are illustrated in diammetrical section, in operative position and, finally, FIG. 3 is a diammetrical sectional view of a variation of the embodiment of said teat cup, in its non operative position.

In all the abovementioned figures, the same reference number represents the same parts or their corresponding ones.

In one of its preferred embodiments, as illustrate in FIGS. 1 and 2, the milking machine object of the present patent application is comprised of a manual vacuum pump, indicated in its whole arrangement by reference 1, which is comprised of a cylinder 1a, fixedly mounted on a frame 1b, which in turn has canalizing functions, to be explained below. This frame 1b is mounted on two bushings 1c, which in turn are rotatable connected by a valve with a suction tubing 2 and an exhaust tubing 3, all this assembly including a suport which consists of straight legs 1d superimposed and bound to the base 1e.

Within the cylinder 1a there is freely located a piston 1f, said cylinder being connected to the heads of the tubing formed by the frame 1b through throats 1g and 1h.

Additionally, this pump 1 is provided with a handle 1i, for activation, located at the extreme of the cylinder 1a.

The bushings 1c are disposed in a diametrically aligned way with respect to the cylinder 1a, defining an axle for central rotation with respect to the cylinder 1a.

These bushings 1c present valve connections with the respective tubings 2 and 3, which are effected in the following manner:

Said bushings internally adopt a frustum cone conformation, cooperating with the end of the extremes of said tubings, which finalize in a radial bend 2b and 3b respectively, which throat is level to the outer surface thereof and in coincident opposition with the tubing formed by the frame 1b, these radial bands being arranged upwards in the tubing 2 and downwards in the tubing 3, in such a way that upon said cylinder taking a vertical position there is simultaneously produced the decompression in the lower part thereof and the filling of the vacuum produced in the upper part, which vacuum is absorbed by the tank 4.

The suction tubing 2, includes in its final point, adjacent to bushing 1c, a vacuum gage 2a and the exhaust tubing 3 includes in its end a shutoff valve 3a.

The suction tubing 2 is connected in its other extreme with a vacuum reserve tank, shown with reference 4, which in turn is connected through said suction tubing to a trap pail 5 to which a plurality of tubings 6 converge, which tubings are interconnected to respective collecting containers 7, which in turn receive concurrently a series of flexible hoses 8, provided in their ends with respective teat cups, shown in their whole assembly arrangements by reference 9.

Shutoff valves 6a are arranged in the respective tubings 6 and in the tubing tract 2 which is disposed between vacuum reserve tank 4 and trap pail 5, there is also arranged a shutoff valve 2b.

The teat cups 9 are comprised of a rubber hollow cylindrical main horn 9a externally provided with an annular flange, 9b, located near one extreme and with another flange, annular also, 9c remote from the former, with the arrangement in an axially fixed way between them, of a counterweight 9d preferably constituted by a cylinder made of metal or any other similarly adequate material.

Said main body has an open end with driven back edges, which form a lug 9e with an annular projection 9f in its face which corresponds with the body internal surface and is aligned in correspondence with the walls thereof. Remote from said projection, and oriented to the hollow inside of the body, there is provided a plurality of projections 9g equally annular and adjacently arranged one with the other, forming a slight contraction in the internal surface of this area. It should be pointed out that both the projection 9f and the projection 9g have a preferably triangular section.

In the internal surface of the body too, and in a position of same which externally corresponds with the location of the counterweight 9d, there is another series of annular projections 9h which optionally may vary in number as it might be considered adequate. Said projections are remote one from the other and show a semicircular section which, if so desired, might also be any adequate one.

In the extreme of the body 9a, opposed to the open one, there is mounted a unidirectional valve device 9i. This device may also be any convenient one, but in the practice it has been found that the device here illustrated carries on its function in excellent manner. Essentially, the valve device shown here is comprised by a jacket 9j firmly fastened to the extreme portion of the body 9a, which may have a thickening in its walls, similar to the illustrated one. In the extreme of said jacket, oriented towards the inside of the body, and in the inner portion thereof, there is a fixed ring 9k in which face, oriented to the inside of the jacket, a sealing ring 9l is seated.

The valve element properly said is comprised of a cylindrical part 9m, axially displaceable within the ring 9k with a total length superior to the length of the jacket 9j, therefore projecting out of both extremes thereof. This part 9m is mounted in an axially displaceable manner on the ring 9k, thereby the greater part of its body having an outer diameter substatially equal to the corresponding inner diameter of said ring and presents an extreme portion which shows out of the jacket with an external diameter sustantially equal to the inner one of the jacket, thereby determining a step 9n, there being a coil spring 9p located between the ring 9l and said step 9n, around the corresponding portion of part 9m.

In turn, the latter has, adjacent to the upperend inside the body 9a a peripheral packing 9q which abuts against the ring 9k, constituting the tight element of the valve device.

The body 9m presents a blind coaxial conduit 9r provided with at least a radial opening 9s, located at longer distance from the end of the part which is introduced within the body 9a than the one in which the packing 9q is located, said perforation being in correspondence with the internal surface of the ring 9k when said packing abuts thereon.

Finally, said conduit runs along a projection 9t which externally has a plurality of annular teeth 9u capable of holding a hose or similar element.

In respect to the variation of embodiment of the teat cup 9 illustrated in FIG. 3, in diametral section, it has the same abovementioned devices with the only difference that the annular projections 9h formed inside the body 9a, adopt a coiling instead of an annular arrangement, as provided in the teat cup initially described.

The operation of the present milking machine is very simple and it is effected in the manner herebelow described.

The frame 1b is rotated, which produces the piston 1f displacement from the upper part of the cylinder 1a towards the lower part, generating a suction or negative pressure in the upper part of the cylinder 1a.

In the practices effected on a prototype model, each 180° turn of the cylinder 1a produced a vacuum flow rate of 6 liters, thereby when effecting four half turns thereof enough vacuum is generated to milk four cows simultaneously.

This flow of vacuum is suctioned from the tank 4 and is shown by the vacuum gage 2a. As the needed vacuum reserve is obtained, the teat cups 9 are placed on the teats of the animals, beginning with the simultaneous milking thereof without the need of newly actuating the vacuum pump until this lot of animals is milked out.

The vacuum is suctioned from tank 4 where it is stored, and when the opening of the teat cup 9 unidirectional valves is produced, the milk is suctioned, passing through tubings 8 to the tight collector containers 7, where it is stored.

In the case that any of the containers is filled out, the product passes through the respective tubing 6 into the trap pail 5 where it is collected.

In the case that the milk is depleted in any of the parts of the teat of the animal or when an accidental fall of the teat cup 9 occurs, its unidirectional valve immediately cuts the vacuum suction out, avoiding in such a way both the product waste and its pollution due to the possible impurities that could be absorbed.

To effect the machine cleaning when the daily operation is finished, the vacuum stored in the reserve tank 4 which has a capacity of about 200 liters, is used in closed circuit, with a lead time of about 20 minutes, for completing this task.

Up to this point the general operation of the machine has been described, going now to explain the characteristics and operation of the teat cups included in it. Once the vacuum is obtained, the teat is introduced in the body 9a in such a way that the lug 9e is abutting against the udder, obtaining an initial tightness through the edges of the same and the projections 9f and 9g which firmly abut against the udder and the teat respectively. On its part the projections 9h tightly surround the teat which, according to its length, juts somewhat out thereof, this portion being the only one subject to the suction effects produced by the vacuum and therefore its relative lengthening is small in proportion to the enlargement of the esphincter, obtaining is such a way that the necessary elasticity of the tissues is maintained to attain this latter result efficiently.

In practice, the placement of the apparatus on the animal's udder is made taking it by the outer part of the valve device 9i which is connected through the flexible conduit 8, pressing it upwards, introducing the test therein. This operation is made easier by the fact that in said upward movement, the inertia of the assembly itself together with the test resistence tend to axially displace the body 9m from the valve device 9i, putting the hole 9s in communication with the body inside 9a and, consequently, producing a suction and the pursuant vacuum in the same, since the entrance is plugged by the teat, which is so drawn into the inside of the body 9a until the lug 9e abuts against the udder in the abovementioned manner.

Once the milking is finished it is sufficient to simply pull the teat cup out to have it loosened or, if this is preferred, put the conduit 9r in communication with the outer ambient which makes the loosening of the apparatus easier.

The teat cup illustrated in FIG. 3 is applied and operates in the same manner that the one previously described.

The invention as above expressed is self evident and does not require further explanation for those skilled in the art.

It is evident that various modification can be introduced in construction and detail without departing from the scope of the present invention which is clearly defined in the claim clauses which follow.

I claim:

1. In a continuous flow vacuum milking system comprising a manually operable vacuum pump means, vacuum reserve tank means, at least one milk tank connected with said reserve tank means, and a plurality of teat cups connected with said milk tank, said vacuum pump means comprising a cylinder containing a piston which is freely displaceable between opposite ends of said cylinder in response to selective reversible vertical positioning of said cylinder, mounting means for said cylinder comprising trunnion and bushing means for supporting the cylinder for rotation about a horizontal transverse axis, valve means in said trunnion and bushing means, first conduit means communicating between opposite ends of the cylinder and said valve means and second conduit means communicating between said valve means and said vacuum reserve tank, said valve means being responsive to rotation of said cylinder to selectively connect the uppermost end of said cylinder with the reserve tank and concurrently to connect the lower end of the cylinder with the atmosphere, whereby vacuum is produced and maintained in said milking system by alternatively positioning the opposite ends of the cylinder in uppermost position, each of said teat cups including automatically operable unidirectional valve means to prevent a loss of vacuum in the system when the teat cup is not in operative position.

2. The invention defined in claim 1, wherein said second conduit means includes shutoff valve means and pressure gauge means.

3. The invention defined in claim 1, wherein said valve means in said trunnion and bushing means comprises a first pair of horizontally spaced, fixed elements and a second pair of elements attached to the cylinder and rotatably engaged with said first pair of elements.

4. The invention defined in claim 1, wherein said mounting means comprises a pair of horizontally spaced, axially aligned, hollow trunnion elements having frusto-conical bearing surfaces and a pair of bushing elements having respective frusto-conical bearing surfaces coacting with the bearing surfaces of said pair of trunnions, one of said pair of elements being supported in fixed positions, one of said fixed elements having conduit means in communication with the reserve tank, the other of the fixed elements having conduit means in communication with the atmosphere.

5. The invention defined in claim 1, wherein said trunnion and bushing means comprises trunnion means having a bearing surface and bushing means having a bearing surface coacting with the first-mentioned bearing surface, said valve means comprises first and second conduit means terminating in respective openings provided in each of said bearing surfaces, said openings being in alignment with each other when the cylinder is in vertical position.

6. The invention defined in claim 1, wherein the body of said teat cups include internal surfaces of flexible material having a plurality of annular internal ridges axially spaced from each other, and a tubular counterweight at least partially surrounding the exterior of the body.

7. The invention defined in claim 6, wherein said ridges are equally spaced from each other.

8. The invention defined in claim 6, wherein the open end of the teat cup is provided with an outer peripheral flange.

9. The invention defined in claim 6, wherein said counterweight comprises a rigid cylindrical jacket fixedly mounted on the body and extending axially a greater distance than said annular internal ridges.

10. The invention defined in claim 6, wherein said unidirectional valve means comprises a tubular element axially, slidably mounted in a complementary tubular sleeve in said teat cup, the inner end of the tubular element being closed, the opposite end being in communication with the milk tank, said tubular element having a radial port adjacent the inner end for communication with the interior of the teat cup in a first position, and spring means urging the tubular element toward another position to cover said port, the fourth of said spring means being insufficient to move said tubular element when said port is open and the interior of the teat cup is under a vacuum pressure differential.

* * * * *